United States Patent [19]
Furukawa

[11] 3,879,110
[45] Apr. 22, 1975

[54] SMALL FLY'S EYE LENS ARRAY

[75] Inventor: Motoaki Furukawa, Tokyo, Japan

[73] Assignee: Nippon Selfoc Company Limited, Tokyo, Japan

[22] Filed: Aug. 15, 1973

[21] Appl. No.: 388,559

[30] Foreign Application Priority Data
Aug. 22, 1972   Japan.................. 47-84284

[52] U.S. Cl................ 350/167; 65/30; 350/175 GN; 350/206
[51] Int. Cl. ............................................. G02b 3/00
[58] Field of Search ...................... 350/175 GN, 167

[56] References Cited
UNITED STATES PATENTS
3,592,529  7/1971  Juhlin et al. ..................... 350/167 X
3,658,407  4/1972  Kitano et al. ............ 350/175 GN X
3,775,110  11/1973  Bestenreiner et al. ........ 350/167 UX

*Primary Examiner*—John K. Corbin
*Attorney, Agent, or Firm*—Hopgood, Calimafde, Kalil, Blaustein & Lieberman

[57] ABSTRACT

A fly's eye lens arrangement is formed in a transparent substrate having a first group of ions by electromigration of a second group of ions through a plurality of apertures in a masking film formed on one surface of the substrate. Electromigration of the second group of ions into the substrate results in the formation of elongated regions in the substrate having a higher index of refraction than the surrounding substrate. Heat is then applied causing diffusion of some of the second group of ions into the substrate and some of the first group of ions into the regions. Each of these regions comprises an individual lens which has a maximum index of refraction along the central axis of the region and in which the index of refraction decreases in a direction outward toward the surrounding substrate.

3 Claims, 6 Drawing Figures

SMALL FLY'S EYE LENS ARRAY

BACKGROUND OF THE INVENTION

This invention relates to the so-called fly's eye lens and, more particularly, to a lens arrangement comprising a great number of small elementary lenses arranged in predetermined spacings in a transparent substrate such as a glass plate.

A fly's eye lens can be used for taking and projecting stereoscopic photographs. Such a lens can also be used for focussing the light beams emitted from an array of light sources such as an array of lasar diodes onto a desired point.

One example of such fly's eye lenses is proposed in a published patent application entitled "A fly's eye lens having light focussing light guide" (Japanese Patent Publication No. 12820/72). The fly's eye lens of this prior art application consists of a bundle of many fibrous light guides, each light guide having a refractive index which decreases in proportion to the square of the radial distance from the center axis of the light guide. In order to manufacture such a lens, a bundle of light guides must first be made and then the bundle must be cut into a desired length. Although this manufacturing method is advantageous in that no spherical grinding of the lens material is necessary to form the individual elementary lenses the problems involved require that considerable man-hours be spent in preparing the bundle of light guides so that the axes of the individual light guides are arranged in parallel. In addition the light guides are often distorted or broken during the cutting process.

OBJECTS OF THE INVENTION

It is therefore an object of the present invention to provide a fly's eye lens and a method for manufacturing the same without resorting to the step of bundling or assembling individual light guides.

Another object of the invention is to provide a fly's eye lens and a process for manufacturing the same which is suited for mass-production.

Still another object of the invention is to provide a fly's eye lens which is capable of intercepting undesired light rays thereby improving the contrast of the image formed.

Yet another object of the invention is to provide an assembly of small elementary lenses of elliptical cross section in which the gradient of the refractive index of each lens depends on the direction with respect to the major and minor axes of the elliptical cross section so that the degree of focussing depends on such direction.

BRIEF DESCRIPTION OF THE INVENTION

In accordance with this invention a lens array is provided including a plurality of elongated regions formed within a substrate having two mutually parallel surfaces and a lower refractive index than the regions. Each of the regions extends into the substrate from the first surface of the substrate toward the second surface along a central axis which is substantially perpendicular to the first surface of the substrate. The refractive index of each of the regions decreases in a direction extending perpendicularly outward from the central axis of the region.

The invention also provides a method of making the above lens array including the steps of providing a transparent substrate containing a first group of ions and having first and second mutually parallel surfaces; forming an apertured film of a material which is impervious to a second group of ions on the first surface of the substrate; forming an electrically conductive layer which will accept ions from the first group of ions on the second surface of the substrate; immersing the first surface of the substrate in a solution containing the second group of ions, ions of the second group causing a greater increase in the refractive index of the substrate than ions of the first group; applying an electric field between the conductive layer and the solution to cause ions of the second group to migrate into the substrate through the apertures in the masking film to form elongated regions of higher refractive index within the substrate; removing the conductive layer from the substrate and heating the substrate to cause diffusion of ions of both the first and second group of ions.

DETAILED DESCRIPTION OF THE INVENTION

The present invention will now be described in detail with reference to the attached drawings.

Figure 1:
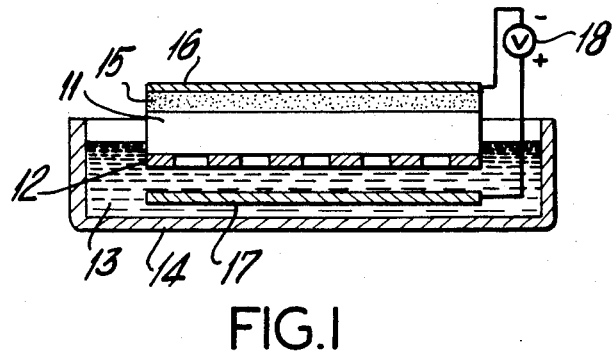
FIG. 1 is a schematic diagram showing the apparatus for the electromigration step in the manufacturing method of the present invention.
Figure 2:
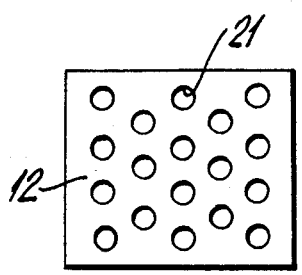
FIG. 2 is a plan view of the masking film used in the method shown in FIG. 1.

In FIG. 1 the numeral 11 denotes a transparent substrate in which a lens array is to be formed. The transparent substrate 11 may, for instance, be made of F2 glass containing K+, and Na+ ions which serve as a first group of ions. F2 glass is a dense flint glass having a high refractive index which includes PbO and $SiO_2$. The top and bottom surfaces of the substrate 11 are finished so that they are flat and substantially parallel. The bottom surface of substrate 11 is coated with a film 12 which is capable of preventing ionic migration. The film 12 has a number of apertures 21. The film 12 may, for instance, be formed by high frequency sputtering of a metal, such as titanium, or a dielectric material, such as glass. The apertures 21 are formed in the film 12 so that they have constant spacings as shown in FIG. 2. The diameter of the apertures 21 is determined by the time required for the thermal diffusion step to be described hereinafter and by the composition of the substrate 11. The diameters of apertures 21 are preferably less than 1 mm so that the thermal diffusion step can be completed within a few tens of hours.

A layer of electrically conductive material 15, such as a nitrate ($KNO_3$, $NaNO_3$) or sulfate ($K_2SO_4$, $Na_2SO_4$) containing clay, is mounted in firm contact with the top surface of the substrate 11. The clay layer 15 accepts or absorbs ions of the first group which are released from the substrate 11.

The bottom surface of substrate 11, including the masking film 12 is then immersed in a fused salt bath 13 as shown in FIG. 1. The fused salt bath 13 is in a container 14 and comprises a solution of a nitrate or a sulfate which includes a second group of ions such as Tl+, CS+ or Rb+. If Li+ is chosen as the ion of the first group, even Na+ or K+ can be chosen as the ion of the second group because the latter has the larger electronic polarizabitity than the former. This second group of ions causes a greater increase in the refractive index of the substrate 11 than the ions of the first group which are contained in the substrate 11. An example of the bath 13 is a solution of $Tl_2SO_4$(50 mol%) mixed with $ZnSO_4$(50 mol%). A d.c. voltage is then applied to generate an electric field between the electrodes 16 and 17 across the substrate 11 in a direction perpendicular to the substrate surface. The electrode 16 including the clay layer 15 is connected to the negative electrode of a power source 18 and the electrode 17 placed within the fused salt bath 13 is connected to the positive electrode of the power source 18.

The electromigration step can, for instance, be performed as follows. The temperature of the substrate 11 and the fused salt bath 13 is raised to about 500°C, which is slightly lower than the softening temperature of the substrate 11, and a voltage of 200 volts d.c. is applied between the electrodes 16 and 17. The substrate 11 consists of a 50 × 50 mm square F2 glass plate which is 3 mm in thickness having an ion change withstanding film coating used as the film 12 as shown in FIG. 2. Under these conditions the current flowing through each of the apertures 21 in said film 12 will be more than 10 mA, causing the ions of the first group in the substrate 11 to move toward the clay layer 15, and at the same time, causing ions of the second group of ions in the fused salt 13 to enter into the substrate 11 in a direction substantially perpendicular to the substrate surface through the apertures 21 in the masking film 12. After the lapse of a predetermined processing time, an elongated region of high refractive index having the cross section which is nearly identical in shape to the aperture 21 is formed in the substrate areas lying beneath each of the apertures 21. The elongated regions extend into the substrate to uniform depths. For example, a depth of 300 microns will result from a processing time of 5 hours and greater depths will result from longer processing times.

The foregoing electromigration process which forms the elongated regions of high refractive index in the substrate 11 is followed by a thermal diffusion step in which the temperature of the substrate is set at about 500°C as in the case of the ion electromigration step. During this thermal diffusion step, mutual diffusion occurs between the elongated high refractive index regions and the remainder of the substrate 11. Ions of the second group diffuse from the elongated regions into the adjacent areas of the substrate and ions of the first group which were in the substrate diffuse into the elongated regions.

As stated before, the second group of ions make a greater contribution to the increase in the refractive index of the substrate than said first group of ions which were in the substrate 11 at the beginning of the process and therefore during the thermal diffusion step the rate of the variation of the refractive index in a direction perpendicular to the axis of each of the elongated regions will be moderated. By suitably choosing the parameters of processing time, temperature, voltage, and the concentration of the fused salt used in the electromigration step as well as in the thermal diffusion step it is possible to obtain the parabolic distribution of the refractive index in each of the elongated cylindrical regions. The refractive index will then decrease nearly in proportion to the square of the distance from the central axis of each of the elongated regions.

Figure 3A:
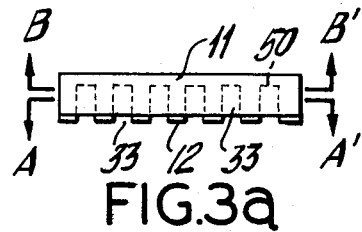
FIG. 3a is a cross-sectional view of a substrate coated with the masking film.
Figure 3B:
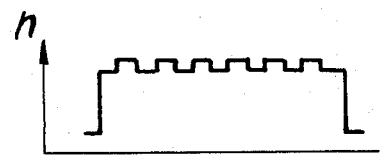
FIG. 3b is a diagram showing the variation of the refractive index across the glass substrate shown in FIG. 3a after the electromigration step of the method.
Figure 3C:
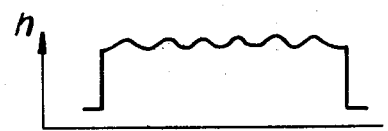
FIG. 3c is a diagram showing the variation of the refractive index across the glass substrate shown in FIG. 3a after the diffusion step of the method.

FIG. 3 illustrates the distribution of the refractive index in the substrate 11 at various stages of the electromigration and thermal diffusion steps. FIG. 3a is a cross-sectional view of the substrate 11 coated with the masking film 12 viewed in a plane containing the central axes of some of the high refractive index regions. The dotted line 50 shows how the high refractive index regions extend into the substrate 11 as a result of the electromigration process. FIGS. 3b and 3c show diagramatically the refractive index distribution in the substrate 11 as a function of substrate width as seen along line A—A' of FIG. 3a. FIG. 3b shows the refractive index distribution after the electromigration step and FIG. 3c shows the refractive index distribution after the thermal diffusion step.

In the example shown in FIG. 3a, the elongated regions 33 of high refractive index do not extend all the way through the substrate 11. These regions may be made to reach the other surface of the substrate by the use of a thin enough glass plate as the substrate 11 or by grinding the unmasked surface of the substrate 11 down to the line B—B' in FIG. 3a to expose portions of the regions 33. The thermal diffusion process then follows the foregoing grinding process.

The time required for the thermal diffusion process is nearly proportional to the square of the diameter of the apertures 21 in film 12. The spacings between the apertures 21 are preferably arranged to be greater than the diameter of the apertures 21 in order to shorten the time necessary for the thermal diffusion step.

The masking film 12 may be removed before or after the thermal diffusion process if desired. If an opaque material is used for the film 12, it may be retained on the substrate to serve as means for intercepting undesired light rays transmitted through the substrate 11 in areas other than the high refractive index regions 33.

Figure 4:
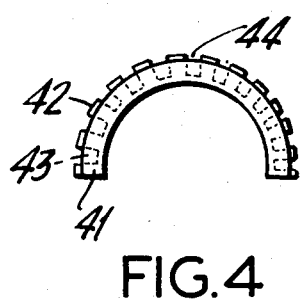
FIG. 4 is a cross-sectional view of a curved glass substrate.

The manufacturing method of the present invention so far described may be applied not only to the flat substrate 11 but also to a substrate of curved surface. FIG. 4 shows a glass substrate 41 with cylindrical surfaces having high refractive index regions 43 formed in the areas exposed by apertures 44 in the masking film 42. To subject such a cylindrical substrate 41 to the electromigration process, electrodes corresponding to those shown as numbers 16 and 17 in FIG. 1 must be made in a curved configuration.

While the apertures 21 of the masking film 12 are of circular shape in the embodiment described above, these apertures may be elliptical in shape. An elliptical shape is effective in those cases where it is desirable to have the gradient of the refractive index vary depending on the direction with respect to the major and minor axes of the elliptic cross section, so that the degree of focussing changes depending on such direction. The diameter of the apertures 21 may also be chosen arbitrarily to be any size ranging from tens of microns to a few mm depending on the intended use of the array produced.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. A fly's eye lens array includes a unitary transparent substrate having first and second mutually parallel curved surfaces, a plurality of elongated regions formed within said substrate, each of said regions having a higher refractive index than the areas of said substrate surrounding said regions, each of said regions extending into said substrate from said first surface toward said second surface along a central axis which is substantially perpendicular to said first surface, the refractive index of each of said regions being highest along said central axis and decreasing in a direction extending perpendicularly outward from said central axis.

2. A lens array as claimed in claim 1, in which said elongated regions are of substantially elliptical cross section and in which the refractive index of each of said regions decreases at varying rates in a direction perpendicularly outward from said central axis, the rate of decrease of said refractive index depending upon the direction with respect to the major and minor axes of the elliptical cross section.

3. A lens array as claimed in claim 1 in which a film of opaque material having a plurality of apertures is provided on at least one of said substrate surfaces and in which said apertures in said film are located over said elongated regions.

* * * * *